United States Patent [19]

Bremyer

[11] Patent Number: 5,240,396
[45] Date of Patent: Aug. 31, 1993

[54] CO-EXTRUSION HEAD

[76] Inventor: Jeff Bremyer, 1509 Heritage Pl., McPherson, Kans. 67460

[21] Appl. No.: 811,074

[22] Filed: Dec. 20, 1991

[51] Int. Cl.⁵ .............................................. B29C 47/20
[52] U.S. Cl. ................... 425/133.1; 425/462; 425/467
[58] Field of Search ............... 425/133.1, 462, 467, 425/380; 264/173, 209.8

[56] References Cited

U.S. PATENT DOCUMENTS

| | | | |
|---|---|---|---|
| 4,061,461 | 12/1977 | Hessenthaler | 425/462 |
| 4,118,167 | 10/1978 | Lund et al. | 425/463 |
| 4,125,585 | 11/1978 | Rosenbaum | 264/173 |
| 4,465,449 | 8/1984 | Hornbeck | 425/131.1 |
| 4,687,430 | 8/1987 | Morris et al. | 425/133.1 |
| 4,723,902 | 2/1988 | Erickson | 425/380 |
| 4,770,618 | 9/1988 | Lupke | 425/72.1 |
| 4,773,448 | 9/1988 | Francis | 264/171 X |
| 4,773,954 | 9/1988 | Starnes, Jr. | 425/133.1 X |
| 4,783,299 | 11/1988 | Prevotat | 264/209.8 X |
| 4,832,589 | 5/1989 | Gini et al. | 425/462 X |
| 4,846,648 | 7/1989 | Spence et al. | 425/133.1 |
| 5,069,850 | 12/1991 | Tompkins et al. | 264/173 X |
| 5,108,683 | 4/1992 | Anand | 425/133.1 X |

Primary Examiner—Richard L. Chiesa
Attorney, Agent, or Firm—Michael Yakimo, Jr.; D. A. N. Chase

[57] ABSTRACT

A co-extrusion head includes a melt housing with bushing housing connected thereto by an intermediate spider. A first resin is injected into the housing through an inlet portion central to a symmetrical annular channel extending through the melt housing for discharge of the first melt at an annular port. Concurrently, a second resin is injected into the housing through a generally straight bore extending between an inlet and outlet port centrally located within the confines of the first annular port. The first resin follows a geometrically balanced flow path from inlet to outlet. The first and second resin flows are directed to a bushing housing by an intermediate spider. Within the bushing housing bore is a pin for forming an external annular channel for the first resin and an internal bore for the second resin. The pin directs the first and second resin flows to a melt juncture so as to meld a core of second resin melt with a surrounding first resin melt. The multi-layer tubular core is then directed downstream for further processing.

5 Claims, 5 Drawing Sheets

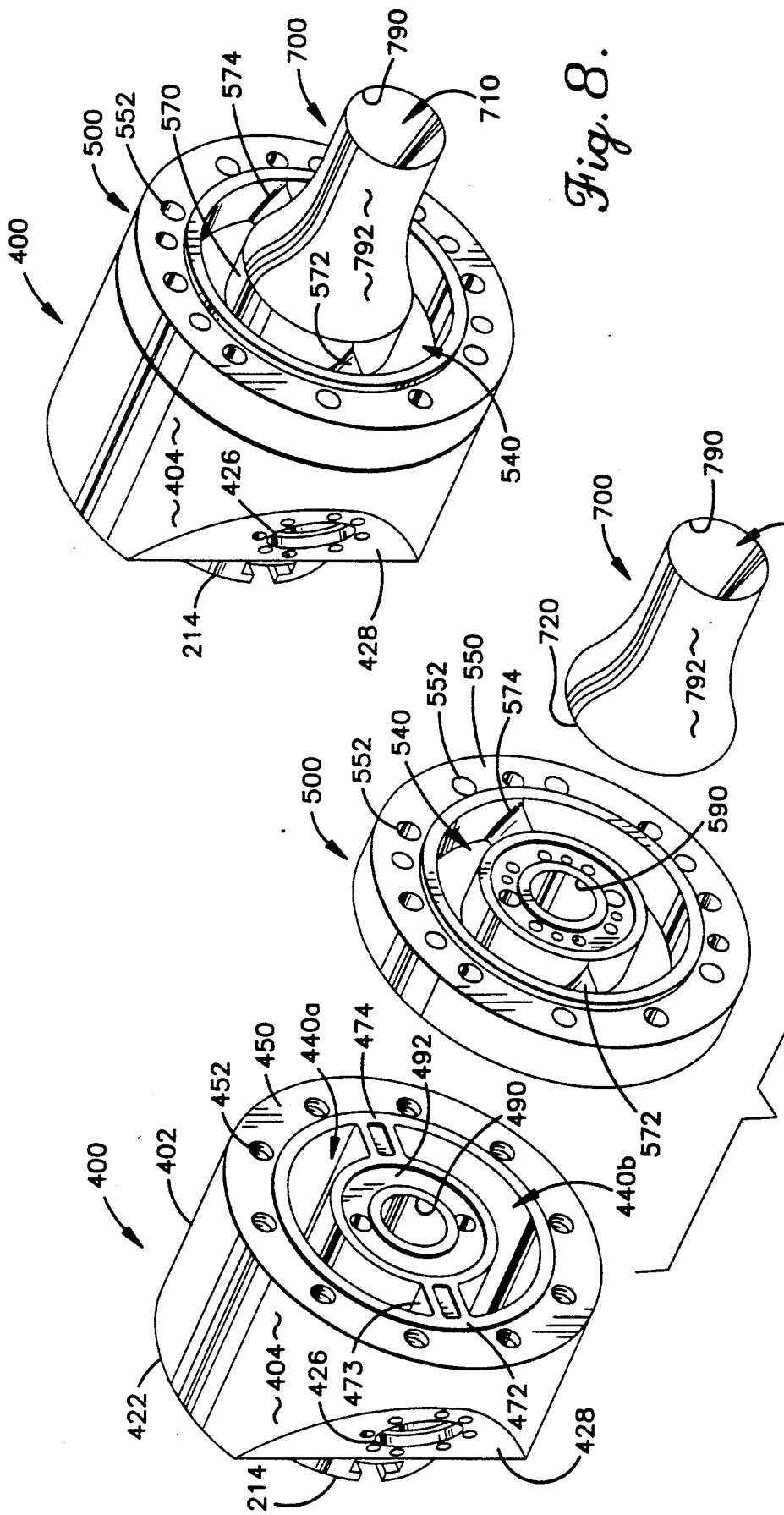

CO-EXTRUSION HEAD

BACKGROUND OF THE INVENTION

This invention relates to the extrusion of polymeric resins and like materials, and more particularly, to a co-extrusion head which efficiently presents a concentric, multi-layer, tubular product to a downstream die head assembly.

Various cross head and die assemblies have heretofore been utilized in an attempt to present a concentric, tubular extrusion of first and second thermoplastic resins to a downstream die assembly. These devices receive thermoplastic resins from upstream sources which are heated and under pressure. Such resins enter a cross head and die assembly and are usually fed into resin distribution channels for downstream flow.

One problem with known prior art devices, presenting multi-layer tubular products, is that the resin or melt for the outside layer enters the assembly from an offset position relative to an annular channel. The resin flowing in the channel is not geometrically balanced as portions of the resin flow must necessarily travel different distances to points around the channel due to the offset inlet port. This geometric imbalance results in an unstable resin flow. In order to stabilize the flow the velocity of the flow must be adjusted. However, the velocity of a resin flow is difficult to adjust absent an increase in temperature and pressure. Such increases can also result in an unstable resin flow. Moreover, at elevated temperatures and/or pressure, the resin may burn causing aberrations in the finished product.

A geometric imbalance in the resin or melt, if not corrected or compensated, can present an uneven wall thickness in the final tubular product. An imbalanced melt flow can cause turbulence which can create conditions disrupting a preferred laminar flow of the resin. Such disruptive flow conditions can result in further aberrations such as an undesirable weld/rupture line in the finished product, rough surfaces on the finished product and discolorations along the surface of the final product. Thus, absent a continuous and special operator attention to the resin flow, it is very difficult to obtain a desired uniform quality in the finished product.

In response thereto I have invented a co-extrusion head for a die assembly which provides for a geometrically balanced flow of first and second resins therethrough. My device generally comprises a melt housing having upstream and downstream faces with a first resin input port in the upstream face. An annular channel extends from the input port and increases in diameter upon its progression through the melt housing. The first resin melt is discharged through an annular outlet on the downstream face at a diameter greater than its input. The annular outlet and inlet ports share an imaginary common axis such that the intermediate annular channel is generally symmetrical about the axis. This structure presents a geometrically balanced channel relative to the inlet and outlet ports such that all the resin particles flowing through the channel travels through equidistant paths between the inlet and outlet apertures.

Concurrently the inner layer of resin material is injected into a second resin inlet on a lateral surface of the melt housing for flow through an intermediate bore crossing the first resin annular channel and discharge from an outlet port which is centrally located within the annular outlet for the first resin. Thus, a first resin flow surrounds a second resin flow upon discharge from the melt housing.

A spider member connects a bushing housing to the melt housing for continuing the above resin flows. The bushing housing includes a central bore having inlet and outlet apertures. Within the central bore is positioned a cone-shaped pin with central bore therein. The external surface of the pin cooperates with the surface of the bushing housing bore to present a channel for flow of the first resin mass therethrough. Concurrently the second resin mass flows through the pin bore for discharge therefrom. The shape of the pin shapes the configurations of the first and second resin mass flows so as to enhance a melding of the resin flows at the downstream pin tip. Accordingly, a tubular product having a first resin layer surrounding a tubular second resin mass is presented for downstream processing by a die inserted within the bushing and attached die head assembly.

It is therefor a general object of this invention to provide a co-extrusion head for efficiently presenting a multi-layer, tubular resin product to a downstream die assembly.

It is another general object of this invention to provide a co-extrusion head, as aforesaid, which presents geometrically balanced resin flows.

Still another object of this invention is to provide a co-extrusion head, as aforesaid, which efficiently melds first and second resin flows of a multi-layer resin product.

A further object of this invention is to provide a co-extrusion head, as aforesaid, which efficiently introduces first and second resin flows into a melt housing.

Another object of this invention is to provide a co-extrusion head assembly, as aforesaid, which provides first and second resin flows that can be easily monitored and efficiently conducted through the head at various temperatures and pressures.

A further object of this invention is to provide a co-extrusion head, as aforesaid, which can efficiently conduct resin flows therethrough at selected velocities.

Still another object of this invention is to provide a co-extrusion head, as aforesaid, which requires minimal tooling so as to connect the same with a downstream die insert and die assembly.

A particular object of this invention is to provide a co-extrusion head, as aforesaid, presenting a geometrically balanced flow of a first resin through a melt housing so as to surround a second resin flow upon discharge from said melt housing.

Another particular object of this invention is to provide a co-extrusion head, as aforesaid, presenting geometrically balanced first and second resin flows through a bushing housing so as to enhance a melding of the resin flows prior to discharge from the bushing housing.

A still further object of this invention is to provide a co-extrusion head, as aforesaid, utilizing a replaceable pin insert in said bushing housing so as to shape the first and second resin flows passing through the bushing housing.

Another particular object of this invention is to provide a pin element, as aforesaid, which can be changed according to the type of resin melt passing through the co-extrusion head.

Other objects and advantages of this invention will become apparent from the following description taken in connection with the accompanying drawings, wherein is set forth by way of illustration and example, a now preferred embodiment of this invention.

BRIEF DESCRIPTION OF THE DRAWINGS

FIG. 7 is an exploded perspective view of the melt housing, spider and shaping pin of the bushing housing.

FIG. 8 is an assembled view of the elements in FIG. 7.

DESCRIPTION OF THE PREFERRED EMBODIMENT

Figure 1:
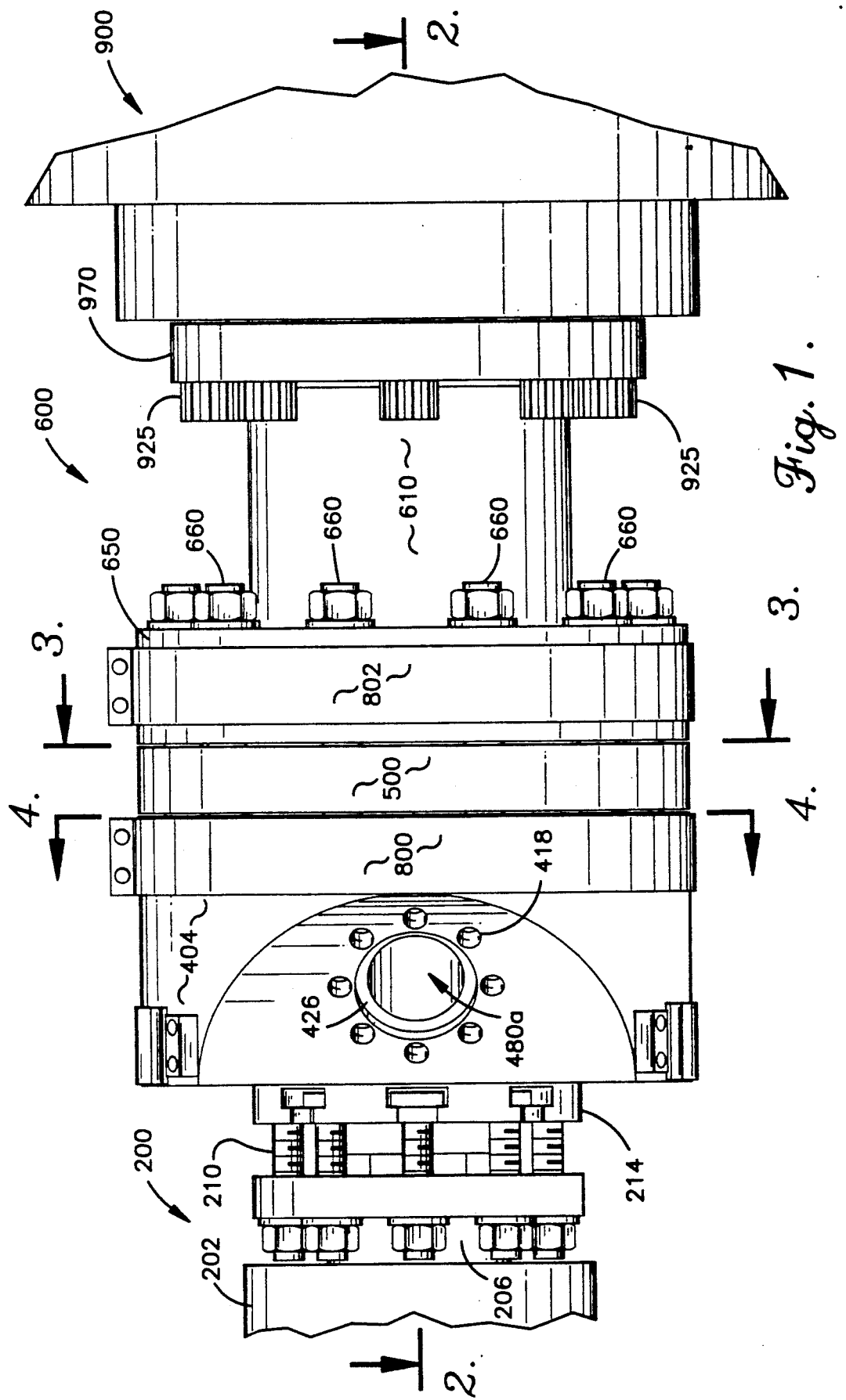
FIG. 1 is a side elevation view of the co-extrusion head illustrating the melt housing and bushing housing attached thereto by an intermediate spider.

Turning more particularly to the drawings, FIG. 1 generally shows a side elevation view of the co-extrusion head 100 assembly attached to a downstream die assembly 900. FIGS. 7 and 8 respectively show a portion of the apparatus 100 in exploded and assembled views. The co-extrusion head assembly 100 comprises a generally cylindrical melt housing 400 with a spider 500 for attaching a bushing housing 600 to the melt housing 400. A pin insert 700, upon attachment to the spider 500, is positioned within the bushing housing 600 as sectionally illustrated in FIG. 2 and illustrated in FIGS. 7 and 8 with the bushing housing 600 removed. Heat bands 800, 802 surround the melt 400 and bushing 600 housings.

Figure 2:
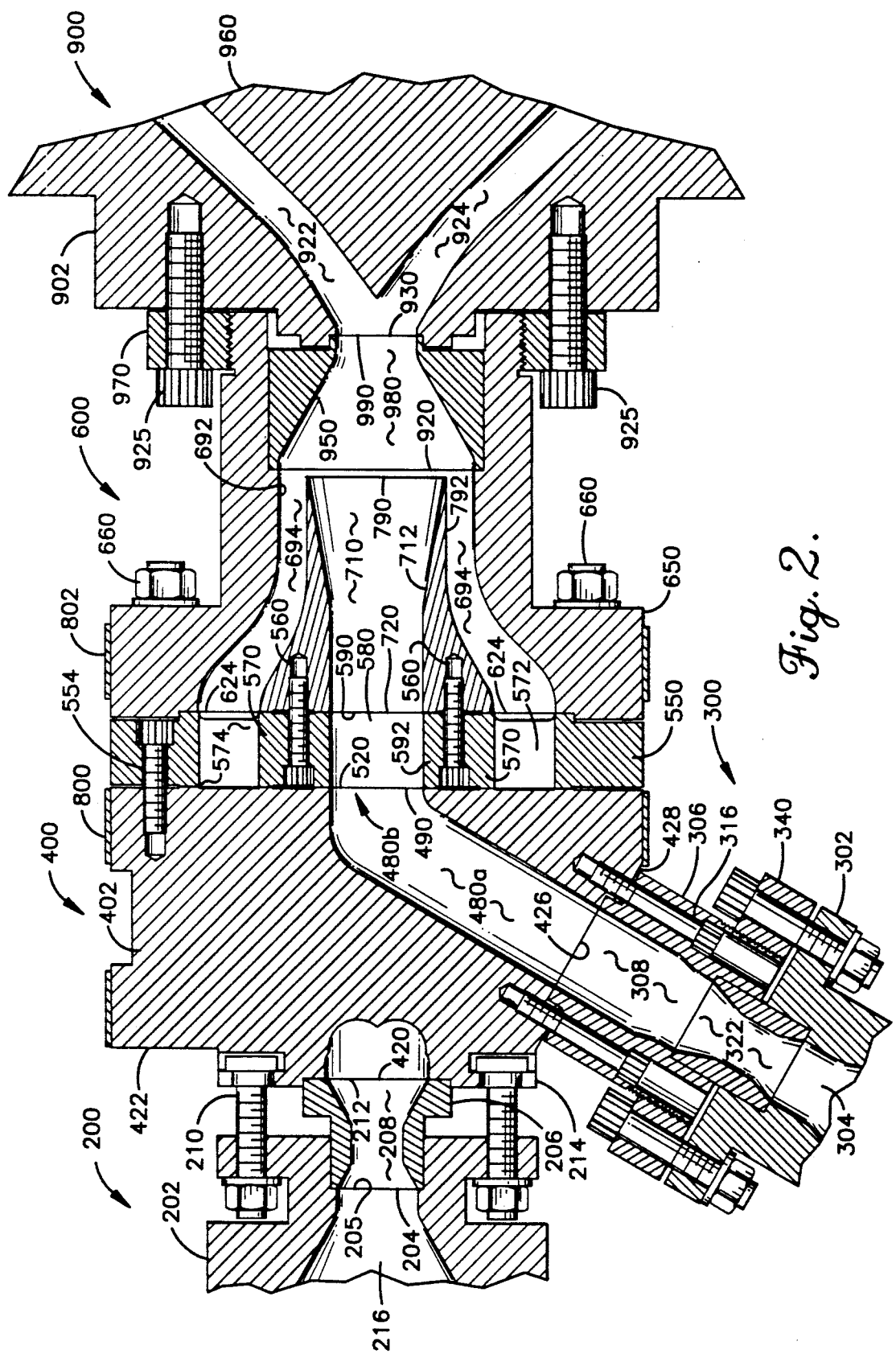
FIG. 2 is a section view, taken along line 2—2 in FIG. 1, with a portion of the melt housing block broken away to show the communication of the first resin inlet port with the annular channel in the melt housing.

A first resin input assembly 200 is shown in FIGS. 1 and 2 and generally comprises a cylindrical input housing 202 having an outlet port 204 at the downstream end with a central bore 216 extending therethrough. The housing 202 is attached to an annular flange 214 on the upstream face 422 of melt housing 400 by bolt/nut combinations 210 with an intermediate adaptor 206 therebetween. An inlet 205 of adaptor 206 communicates with the upstream outlet 204. The outlet 212 of the adaptor 206 bore 208 communicates with the downstream inlet port 420 in the upstream face 422 of the melt housing 400.

Figure 5:
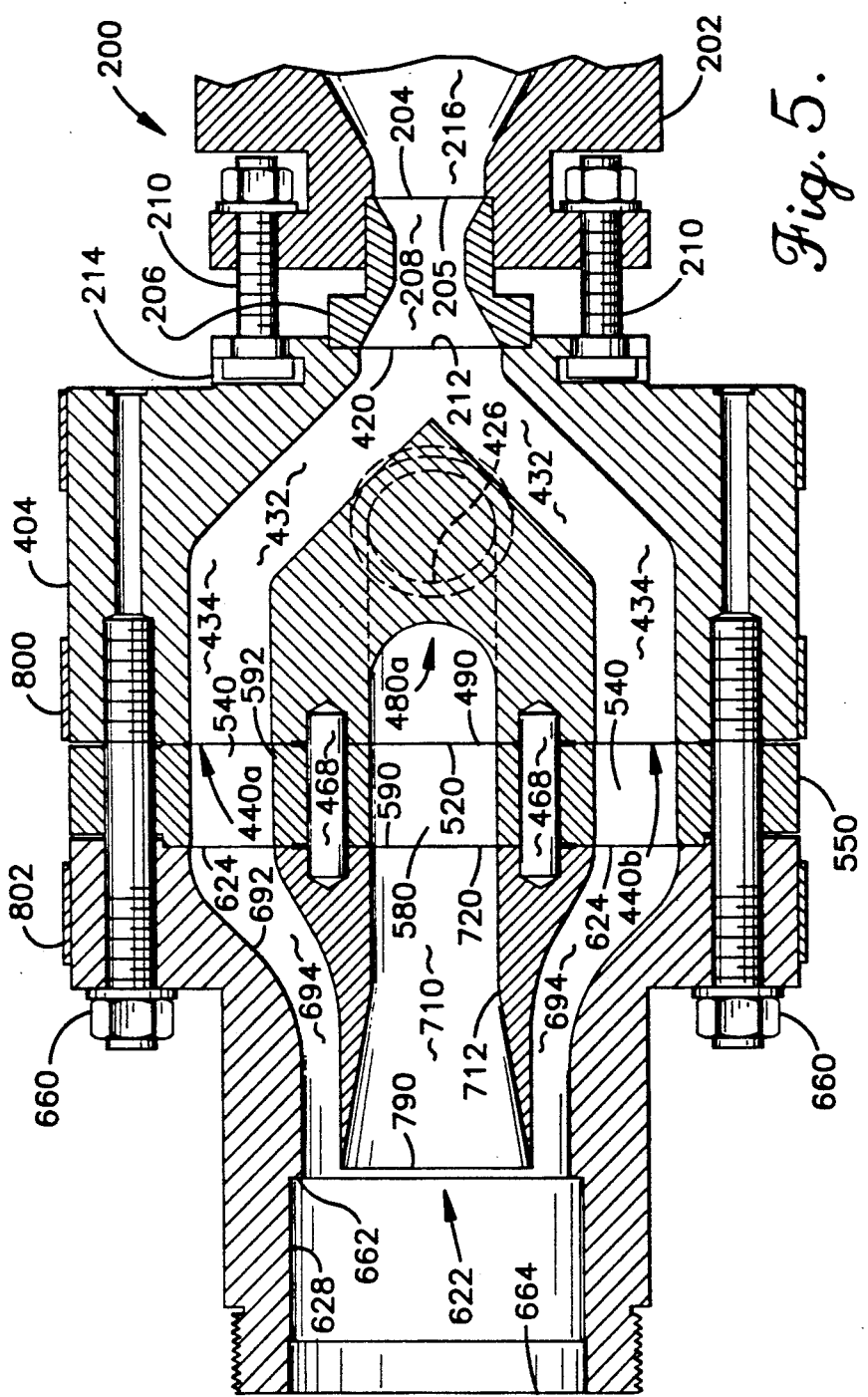
FIG. 5 is a sectional elevation view, taken along line 5—5 in FIG. 1, illustrating from left to right the bushing housing, spider and melt housing with the second resin bore shown in phantom lines extending between the inlet and outlet apertures.

Within the block 402 of melt housing 400 is bored a melt channel 430 (FIG. 5) having a first annular cone-shaped portion 432, designated as an intake channel 432. This intake channel 432 begins at the inlet port 420 and extends towards the exterior surface 404 of housing 400. The intake channel 432 communicates with an annular channel portion 434, designated as exit channel 434, which forwardly extends towards the downstream face 450 of melt housing 400. The downstream end of exit channel 434 presents an outlet port 440 divided into hemispherical sections 440a, 440b by a central resin housing 470. Vanes 472, 474 present upper and lower flow surfaces 473, 475, 477, 479 which extend between the central housing 470 and the outside surface 436 of the melt channel 430. These vanes 472, 474 extend from the body block 402 and across the channel 430 for connection with the central housing block 470. As such the vanes 472, 474 present the above-described flow surfaces while supporting the central housing block 470 within the surrounding channel 430.

A second resin input assembly 300 generally comprises a resin adaptor housing 302 attached to a collar 340. Collar 340 threadably engages an extruder adaptor 306 which is attached to a chamfered surface 428 of melt housing 400 by bolts 316. Input housing 302 includes an intermediate bore 304 in communication with a bore 332 of a housing insert 320. This bore 322 further communicates with adaptor 306 bore 308.

Input housing 302 delivers a second resin melt from an upstream extruder to a circular input port 426 located in the chamfered surface 428 of housing 400. This circular inlet or port 426 is preferably located at a position 90° from top dead center of the upstream surface 422 in a clockwise or counterclockwise direction as viewed downstream (clockwise as shown). A bore 480 of preferably constant diameter extends through the body 402 of the melt housing 400 and through the vane 474 bounded by the upper 473 and lower 477 flow surface as shown in hidden lines in FIG. 5. Bore 480 comprises a first intake portion 480a extending through this vane. The intake bore 480a communicates with a second resin exit bore 480b within the output housing 470. The terminus of this bore 480b presents output port 490.

Figure 4:
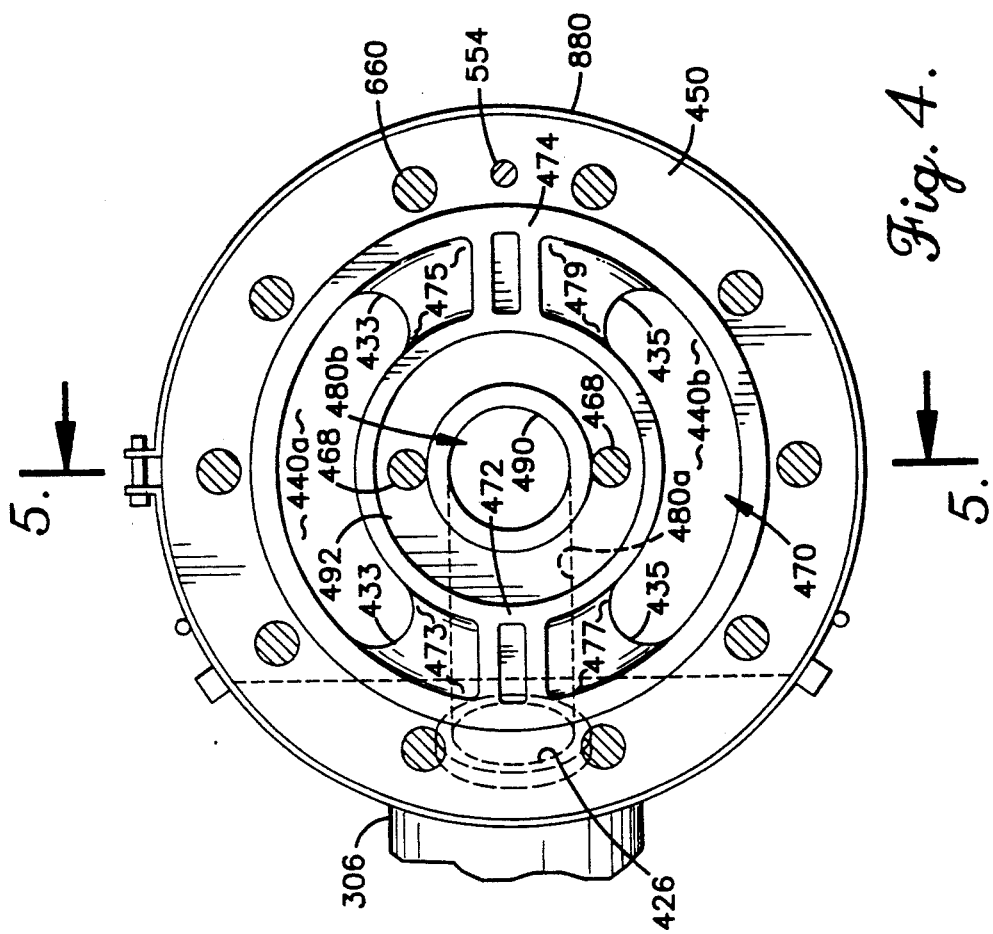
FIG. 4 is a sectional view, taken along line 4—4 in FIG. 1, illustrating the downstream face of the melt housing and illustrating in hidden lines the second resin bore extending between the second resin inlet and second resin outlet in the central housing.

The output port 490 is necessarily smaller than the surrounding upper 440a and lower 440b first resin discharge ports. As shown in FIGS. 4 and 7, the port 490 is surrounded by an annular rim 492 with the upper 440a and lower 440b first resin ports therearound. The above-described channels 432, 434 are milled in the housing block 402. This process leaves the central housing 470 with the support vanes 472, 474 extending across the channel 430. Bore 480, as milled through the stock of housing block 402, extends between the inlet 426 and outlet ports 490, i.e. through the body block 402, the upper 473 and lower 477 exit flow surfaces of vane 472 and housing 470. This relationship allows the second resin melt flow to cross a portion of the first resin flow without interference therewith. The output of the second resin melt at 490 is then positioned within the output flow of the first resin melt travelling through the annular exit channel 434.

A first resin melt enters melt housing 400 via input assembly 200. Upon entry into inlet 420 the melt is directed from inlet 420 into a balanced, geometrical flow through the above-described annular intake channel 432 in the melt housing 400. The configuration of channel 432 increases the diameter of the first resin flow mass relative to the flow diameter at entrance to input port 420. As inlet 420 is at a center point of the annular intake channel portion 432, the particles of the first resin mass travel in geometrically balanced directions from the inlet aperture 420 and towards the exit channel 434. This geometric balance provides a generally equal flow path to all particles of the first resin mass flow. Thus, all particles of the first resin mass can flow downstream at the same velocity. This geometrically balanced flow path and particle velocity eliminate the aberrations arising from a non-balanced, geometric flow as found in the prior art.

Subsequently, the first resin mass flow enters the annular exit flow channel 434. (The juncture of the intake and exit flow channels in the drawings has been labeled as 433, 435.) The first resin flow is then directed to the upper 440a and lower 440b outlet ports. Thus, at the downstream face 450 of melt housing 400 the first resin flow surrounds the second resin flow being discharged from output port 490 for further downstream processing.

Figure 3:
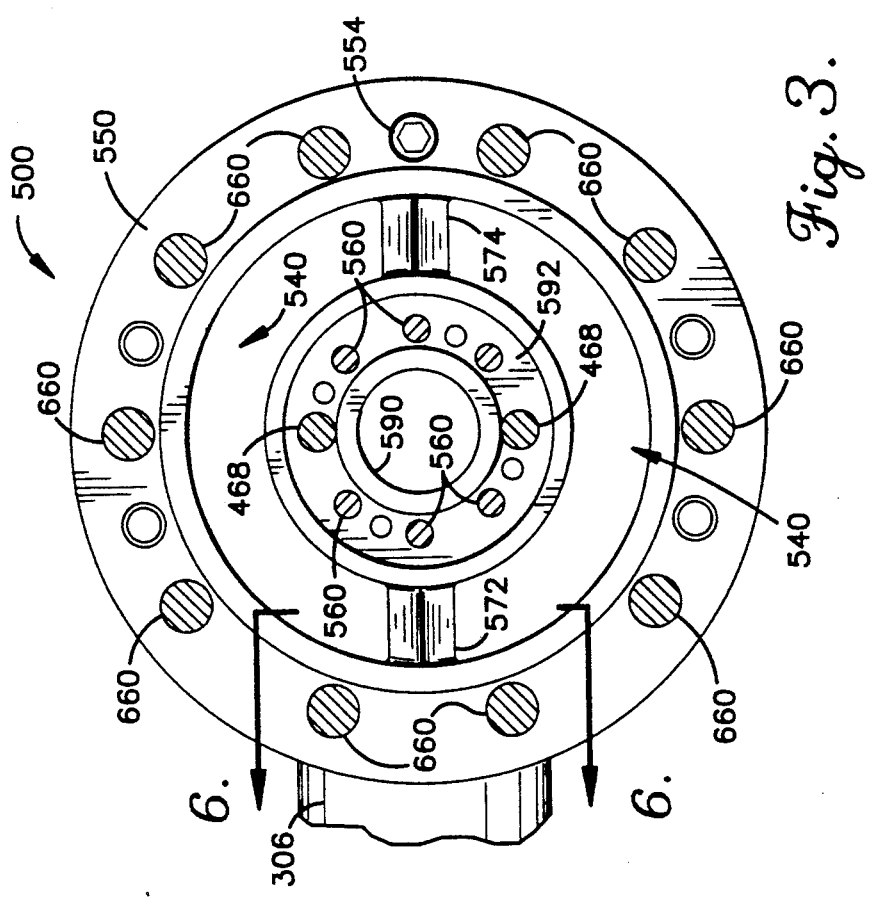
FIG. 3 is a sectional view, taken along line 3—3 in FIG. 1, illustrating the downstream face of the intermediate spider.
Figure 6:
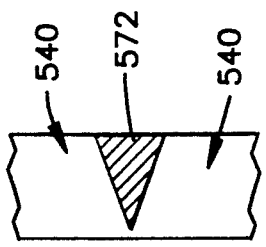
FIG. 6 is a sectional elevation view, taken along line 6—6 in FIG. 3, illustrating a vane in the spider extending between the spider central housing and a surface of the annular bore.

A bushing housing 600 is connected to the downstream face 450 of melt housing 400 by means of an intermediate spider 500. The spider 500 (FIG. 3) presents a circular rim 550 congruent to the rim on the downstream face 450 of housing 400. Dowels 468 extend from rim 492 surrounding port 490 and extend through apertures in the spider rim 492 to effect alignment between the melt housing 400 and spider 500. The rim 550 includes a plurality of apertures 552 aligned with apertures 452 in the downstream face 450 of housing 400 which receive a plurality of connecting bolts 660 therebetween. Connecting bolts 554 (one shown) also fasten the spider 500 to the housing 400. Vanes or webs 572, 574 extend across the annular channel 540 and connect with the central housing 570. (It is here noted that spider vanes 572, 574 have not been sectioned in FIG. 2 to assist in illustration.) Upon connection these vanes lie downstream to the melt housing vanes 472, 474. This vane relationship minimizes any obstruction to a smooth laminar flow of the first resin mass through an annular channel 540 of spider 500. The inlet aperture 520 of a central bore 580 within housing 570 lies congruent with outlet port 490 in the housing 470. Surrounding the output aperture 590 of the bore 580 is an annular rim 592 having a plurality of apertures 594 therein.

The bushing housing 600 presents a generally circular mounting flange 650 with apertures 652 for alignment with spider 500 apertures 552 and housing 400 apertures 452. Bolt/nut combinations 660 extend through the aligned apertures 452, 552, 652 for connection of bushing housing 600 to melt housing 400 with spider 500 therebetween. The bushing housing 600 further includes a forwardly extending cylindrical portion 610 reduced in diameter from that of mounting flange 650.

Extending through a portion of housing 600 is a generally cone-shaped bore 622 having an inlet port 624. An annular shoulder 662 is presented about the interior of housing 600. A cylindrical portion 628 of bushing bore 622 extends from shoulder 662 and presents an outlet port 664 at the downstream end of the housing 600.

Positioned with the bore 662 is a cone-shaped pin 700 which receives the free portion of the alignment dowels 468 in apertures in its base. The pin is attached to the central annular rim 592 of spider 500 by bolts 560 extending from spider rim 592 and into apertures in the pin base 700. Pin 700 includes an inlet port 720 congruent with the outlet port 590 of spider 500. A central bore 710 extends through pin 700. As shown, the pin bore 710 diverges at 712 to present an outlet 790 having a diameter greater than the inlet 720. The exterior surface 792 of the pin 700 cooperates with the interior surface 692 of bore 622 to form an annular channel 694 surrounding pin 700.

Inserted against the annular shoulder 662 and within the downstream bore 628 of housing 600 is a die insert 950 having an inlet port 920 and an outlet port 990. A die assembly 900 is attached to the end of the housing 600 by means of bolts 925 extending through a collar 970 threaded about the end of the bushing block 600 and into the die head block 902. The die head block 902 presents an inlet port 930 congruent with the outlet port 990 of the insert 950. As shown, a die 960 within block 902 separates the resin flow into channels 922, 924.

In use the first extruded resin mass flows through input assembly 200 and enters melt housing 400 through inlet port 420. The mass is then directed from inlet port 420 through the diametrically expanding intake channel 432 for flow through exit channel 434 and discharge from outlet port 440. As shown the center point of inlet port 420, outlet port 440 and outlet port 490 lie on an imaginary longitudinal axis extending through melt housing 400. This central position of the inlet 420 relative to the inlet 432 and exit 434 channels presents a symmetrical flow path to the first resin mass. As the flow distance for each resin particle between the upstream 422 and downstream 450 faces of the housing 400 are generally equal, a smooth laminar flow of the first resin mass occurs through melt housing 400 for ejection through ports 440a, 440b on the downstream 450 at an increased diameter relative to the input diameter at the inlet 420. The first resin mass then flows through the annular spider 500 channel 540 and is discharged at 590 into the annular channel 694 of bushing housing 600. This first resin mass then flows through channel 694 of bushing housing and through the die insert 950 in the downstream end of the bushing housing 600.

Concurrently a second resin mass is injected into the bore 480 through input assembly 300 for ejection from outlet port 490 of the housing 400 bore 480. This second resin mass flow is surrounded by the first resin mass flow. The second resin mass is directed through central bore 580 of spider 500 and into the bore 710 of pin 700 for discharge from pin outlet 790. At this outlet a melding of the second resin layer, now in the form of a tubular core, occurs with the surrounding first resin layer.

It is here noted that the exterior pin surface 692 configuration and/or interior bore 710 configuration may be varied by replaceable pins 700' (not shown) so as to vary the width of the annular first resin channel 694 and/or the diameter of the pin output port 790. Such a change in pin 700 configuration and width of the channel 694 and/or bore 710 is made according to the characteristics of the fist and second resin melts utilized. Thus, the juncture of the resin melts at the adjacent termini of channel 694 and pin 700 bore 710 can be modified according to job parameters. Also, the diameter of the second resin core and thickness of the surrounding first resin layer can be varied according to the desired parameters of the tubular product which is to be delivered to the die insert 950. The tubular product is then directed through the bore 980 of die insert 950 for further shaping and subsequent delivery to the inlet port 930 of the main die head assembly 900.

It is to be understood that while a certain form of this invention has been illustrated and described, it is not limited thereto except insofar as such limitations are included in the following claims and allowable functional equivalents thereof.

Having thus described the invention what is claimed as new and desired to be secured by Letters Patent is as follows:

1. In a co-extrusion head having a melt housing and a bushing housing, the melt housing having a first annular channel extending between an inlet and outlet for flow of a first resin therethrough, the bushing housing having a bore extending between an upstream inlet and a downstream outlet, the improvement comprising means for communicating the first resin flow and a second resin flow from the melt housing to the bushing housing comprising:

a second resin inlet in said melt housing for receiving the second resin therein;

a second resin outlet at a downstream surface on said melt housing, said outlet surrounded by the first annular channel outlet;

a bore in said melt housing for communicating the second resin flow between said second resin inlet and outlet and across a portion of the first annular channel, the first and second resin flows being concurrently discharged from the melt housing;

a spider;

a substantially annular channel extending through said spider for communication with the first annular channel outlet in the melt housing and the bore inlet in the bushing housing;

a central housing surrounded by said annular channel in said spider;

a bore in said central housing for communicating the second resin outlet in the melt housing and the bore inlet in the bushing housing;

means for attaching said spider between the melt housing and the bushing housing with said spider channel and central housing bore in communication with the respective channel and bore of the melt housing and the bore in the bushing housing;

a pin having a configuration for insertion into the bore of the bushing housing, said pin having an exterior surface displaced from a surface of the bushing housing bore upon said insertion;

a bore extending through said pin and presenting an inlet and outlet for flow of the second resin therethrough;

means for releasably attaching said pin to said central housing of said spider with said central housing bore of said spider in communication with the pin bore inlet, said pin displacement from the surface of the bushing housing bore presenting a channel in the bushing housing for flow of the first resin therethrough, the first resin and second resin flows through the bushing housing being conformed to the respective configurations of an outlet of the bushing housing channel and the pin bore outlet upon discharge therefrom.

2. A co-extrusion head comprising:

a melt housing block presenting an upstream surface and a downstream surface;

a first resin inlet in said upstream surface for receiving a first resin flow therein;

a first resin outlet in said downstream surface, said outlet having an area greater than said inlet;

an annular intake channel in communication with said first resin inlet, said intake channel having a configuration increasing in diameter upon a progression through said melt housing block from said inlet to said outlet;

an annular exit channel in communication with said annular intake channel and extending towards said downstream face of said melt housing, said exit channel having an aperture in said downstream face presenting said first resin outlet, said first resin outlet having a diameter greater than a diameter of said first resin inlet for discharge of said first resin flow therefrom;

a second resin inlet in said melt housing for receiving a second resin therein;

a second resin outlet in said upstream surface, said second resin outlet surrounded by said first resin outlet;

a second resin housing surrounded by said exit channel, said second resin housing presenting said second resin outlet at said downstream face;

at least one web extending between said second resin housing and an outside surface of said exit channel;

a bore extending through said web and between said second resin inlet and outlet for flow of said second resin therein, said second resin flow discharged from said second resin outlet;

a spider for placement between said melt and bushing housings;

an annular bore in said spider for communication with said first resin outlet in said downstream face of said melt housing;

a central housing in said spider with a bore for communication with said second resin outlet of said melt housing;

means for attaching said spider to said melt housing with said annular and central housing bores of said spider in respective communication with said first resin outlet and said second resin outlet of said melt housing;

a bushing housing having upstream and downstream surfaces;

a bore through said bushing housing extending between an upstream inlet aperture and a downstream outlet aperture;

a pin having a configuration for insertion into said bore of said bushing housing;

a bore extending through said pin and presenting inlet and outlet apertures, said pin bore conforming said second resin flow to a configuration of said outlet aperture of said pin bore;

means for attaching said bushing housing to said spider, said annular bore in said spider in communication with said inlet aperture of said bushing housing;

means for positioning said pin within said bore of said bushing housing whereupon an exterior surface of said pin is displaced from an interior surface of said bushing housing bore and said central housing bore of said spider is in communication with said inlet aperture of said pin bore for flow of said second resin through said pin and pin outlet aperture, said pin displacement presenting a channel between said inlet and outlet apertures of said bushing housing for flow of said first resin therethrough as discharged from said first resin outlet of said spider, said channel conforming said first resin flow to a configuration of said outlet aperture of said bushing housing, the discharge of the respective resin flows from said bushing housing outlet aperture and said pin outlet aperture presenting a combined resin mass having an outer layer of said conformed first resin flow and an inner layer of said conformed second resin flow.

3. The apparatus as claimed in claim 2 wherein said annular bore and said central housing bore in said spider are respectively congruent with said exit channel aperture and said second resin outlet of said melt housing.

4. The apparatus as claimed in claim 3 wherein said annular bore and said bore in said spider central housing are respectively congruent with said inlet aperture of said bushing housing channel and said inlet aperture of said pin bore.

5. The apparatus as claimed in claim 2 wherein said pin positioning means comprises means for releasably attaching said pin to said central housing of said spider with said central housing bore in said spider in communication with said pin bore.

* * * * *